(12) United States Patent
Zhou

(10) Patent No.: US 10,371,088 B2
(45) Date of Patent: Aug. 6, 2019

(54) HEAT EXCHANGER FOR A RANKINE CYCLE IN A VEHICLE MUFFLER

(71) Applicant: Ford Global Technologies, LLC, Dearborn, MI (US)

(72) Inventor: Shiguang Zhou, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 541 days.

(21) Appl. No.: 15/043,760

(22) Filed: Feb. 15, 2016

(65) Prior Publication Data

US 2017/0234265 A1  Aug. 17, 2017

(51) Int. Cl.
| | | |
|---|---|---|
| F02G 5/02 | (2006.01) |
| F01K 13/00 | (2006.01) |
| F01K 13/02 | (2006.01) |
| F01N 1/16 | (2006.01) |
| F01N 3/02 | (2006.01) |
| F01N 5/02 | (2006.01) |

(52) U.S. Cl.
CPC .............. *F02G 5/02* (2013.01); *F01K 13/003* (2013.01); *F01K 13/02* (2013.01); *F01N 1/163* (2013.01); *F01N 1/165* (2013.01); *F01N 3/0205* (2013.01); *F01N 5/02* (2013.01); *F01N 2590/11* (2013.01); *Y02T 10/16* (2013.01); *Y02T 10/166* (2013.01); *Y02T 10/20* (2013.01)

(58) Field of Classification Search
CPC ........ F01K 13/003; F01K 13/02; F01N 1/163; F01N 1/165; F01N 3/0205; F01N 5/02; F01N 2590/11; F02G 5/02
USPC ............................................ 418/618; 60/618
See application file for complete search history.

(56) References Cited

U.S. PATENT DOCUMENTS

| | | | |
|---|---|---|---|
| 3,841,841 A | | 10/1974 | Torosian et al. |
| 4,621,677 A | * | 11/1986 | Suzuki ...................... F28F 9/22 165/135 |
| 6,968,923 B2 | | 11/2005 | Schmaeman |
| 8,387,386 B2 | | 3/2013 | Schmeltz |
| 8,397,863 B2 | * | 3/2013 | Paze' ....................... F01N 1/166 165/138 |
| 9,574,471 B2 | * | 2/2017 | Hayama .................. F01N 1/166 |
| 2003/0127281 A1 | | 7/2003 | Bravo |
| 2006/0054381 A1 | * | 3/2006 | Takemoto ............... F01N 1/003 181/237 |
| 2009/0049832 A1 | | 2/2009 | Hase |
| 2009/0211253 A1 | * | 8/2009 | Radcliff ................ F01K 23/065 60/670 |
| 2013/0112382 A1 | | 5/2013 | Brunner et al. |
| 2013/0167517 A1 | | 7/2013 | Düpmeier et al. |

(Continued)

FOREIGN PATENT DOCUMENTS

EP  2559870 B1  6/2014

*Primary Examiner* — Patrick D Maines
*Assistant Examiner* — Dapinder Singh
(74) *Attorney, Agent, or Firm* — Brooks Kushman P.C.; Julia Voutyras

(57) ABSTRACT

A vehicle is provided with an engine having an exhaust gas system comprising a muffler body containing a valve controlling exhaust gas flow through a tuning tube. The vehicle has an expander, a condenser, a pump, and an evaporator in sequential fluid communication in a closed loop containing a working fluid. The evaporator is positioned within the body and supports the valve and tuning tube therein, with the evaporator in thermal contact with exhaust gas and the working fluid.

18 Claims, 3 Drawing Sheets

(56) References Cited

U.S. PATENT DOCUMENTS

2014/0208725 A1* 7/2014 Schweizer ............... F01N 5/02
  60/320
2016/0290175 A1* 10/2016 Kontomaris ........... C09K 5/045

* cited by examiner

US 10,371,088 B2

HEAT EXCHANGER FOR A RANKINE CYCLE IN A VEHICLE MUFFLER

TECHNICAL FIELD

Various embodiments relate to a heat exchanger for transferring heat to a working fluid in a thermodynamic cycle, such as a Rankine cycle, in a vehicle.

BACKGROUND

Vehicles, including hybrid vehicles, have internal combustion engines that produce exhaust gases at a high temperature. The vehicle also may have various systems with waste heat that require cooling, e.g. the engine coolant system with coolant fluid. A thermodynamic cycle such as a Rankine cycle may be used to recover waste heat within the vehicle during operation, for example by using engine exhaust gases, and provide power to the vehicle using a heat exchanger. Often, the engine exhaust may directly heat the working fluid in the thermodynamic cycle in a heat exchanger.

SUMMARY

According to an embodiment, a vehicle is provided with an engine having an exhaust gas system comprising a muffler body containing a valve controlling exhaust gas flow through a tuning tube. The vehicle has an expander, a condenser, a pump, and an evaporator in sequential fluid communication in a closed loop containing a working fluid. The evaporator is positioned within the body and supports the valve and tuning tube therein, with the evaporator in thermal contact with exhaust gas and the working fluid.

According to another embodiment, a vehicle muffler is provided with a housing having an exhaust gas inlet and an exhaust gas outlet. A tuning tube is positioned within the housing and supports a valve to control exhaust gas flow through the tuning tube. A conduit is provided for flow of a working fluid in a Rankine cycle therethrough. The conduit is positioned within the housing, supports the tuning tube, and is in thermal contact with exhaust gases and the working fluid.

According to yet another embodiment, a method of controlling a vehicle is provided. A working fluid is heated in a heat exchanger in a thermodynamic cycle with the heat exchanger positioned within a muffler to support a tuning tube therein and in thermal contact with engine exhaust gases. In response to receiving a signal indicative of a temperature of the working fluid, a position of a valve associated with the tuning tube is controlled to control exhaust gas flow therethrough.

Various embodiments according to the present disclosure provide associated, non-limiting advantages. For example, A thermodynamic cycle such as a Rankine cycle may be used to convert thermal energy into mechanical or electrical power. Efforts have been made to collect thermal energy more effectively from engine exhaust gases as they reject waste heat in the vehicle. The present disclosure provides for a Rankine cycle with a heat exchanger or evaporator provided within a muffler or as a muffler in an exhaust system of an internal combustion engine. The exhaust gases heat and evaporate the working fluid in the evaporator. The heat exchanger or evaporator structure in the muffler acts to decrease the amount of noise emitted by the exhaust of an internal combustion engine, and is configured as an acoustic sound reduction or soundproofing structure to reduce the pressure and associated sound created by the engine. The evaporator structure may include various passages for the exhaust gases that are harmonically tuned to cause destructive interference to cancel opposing sound waves. By incorporating the evaporator into the muffler structure, opposed to having two separate devices in the exhaust flow, e.g. a muffler and a separate heat exchanger for the thermodynamic cycle, the overall back pressure on the engine may be reduced, which in turn leads to an increase in engine efficiency and fuel economy for the vehicle. The evaporator structure in the muffler acts to reduce the temperature of the exhaust gases, which in turn also reduces the pressure, and sound pressure or acoustic pressure, of the engine exhaust, and leads to noise reduction for the vehicle.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Description of constituents in chemical terms refers to the constituents at the time of addition to any combination specified in the description, and does not necessarily preclude chemical interactions among constituents of the mixture once mixed. A fluid as described in the present disclosure may refer a substance in various states or phases including to vapor phase, liquid phase, mixed vapor/liquid phase, superheated gases, sub-cooled liquids, and the like.

A thermodynamic cycle such as a Rankine cycle may be used to convert thermal energy into mechanical or electrical power. Efforts have been made to collect thermal energy more effectively from engine exhaust gases as they reject waste heat in the vehicle. The present disclosure provides for a Rankine cycle with a heat exchanger or evaporator provided within a muffler or as a muffler in the exhaust system for an internal combustion engine. The exhaust gases heat and evaporate the working fluid in the evaporator. The evaporator structure in the muffler acts to decrease the amount of noise emitted by an exhaust of an internal combustion engine, and is configured as an acoustic sound reduction or soundproofing structure to reduce the pressure and associated sound created by the engine. The heat exchanger or evaporator structure may include various passages for the exhaust gases that are harmonically tuned to cause destructive interference to cancel opposing sound waves. By incorporating the evaporator into the muffler structure, opposed to having two separate devices in the exhaust flow, e.g. a muffler and a heat exchanger, the overall back pressure on the engine may be reduced, which in turn leads to an increase in engine efficiency and fuel economy for the vehicle. The evaporator structure in the muffler acts to reduce the temperature of the exhaust gases, which in turn also reduces the pressure, and sound pressure or acoustic pressure, of the engine exhaust, and leads to noise reduction for the vehicle.

Figure 1:
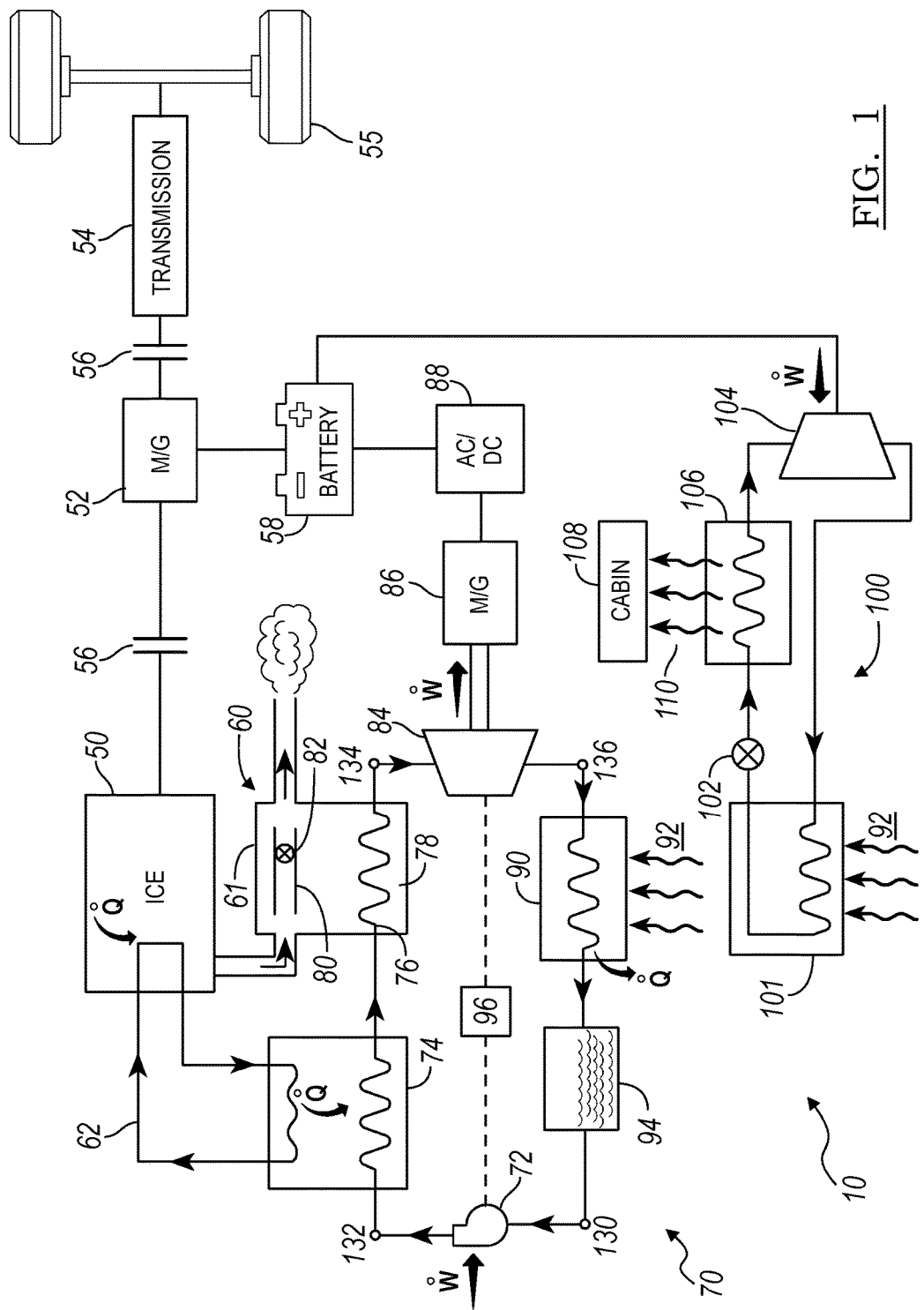
FIG. 1 illustrates a schematic of systems of a vehicle according to an embodiment.

FIG. 1 illustrates a simplified schematic of various systems within a vehicle 10 according to an example. Fluids in various vehicle systems may be cooled via heat transfer to a working fluid within heat exchangers of a Rankine cycle, and the working fluid is in turn cooled in a condenser of the Rankine cycle using ambient air. The Rankine cycle allows for energy recovery by converting waste heat in the vehicle to electrical power or mechanical power that would otherwise be transferred to ambient air.

The vehicle may be a hybrid vehicle with multiple sources of torque available to the vehicle wheels. In other examples, the vehicle is a conventional vehicle with only an engine. In the example shown, the vehicle has an internal combustion engine 50 and an electric machine 52. The electric machine 52 may be a motor or a motor/generator. The engine 50 and the electric machine 52 are connected via a transmission 54 to one or more vehicle wheels 55. The transmission 54 may be a gearbox, a planetary gear system, or other transmission. Clutches 56 may be provided between the engine 50, the electric machine 52, and the transmission 54. The powertrain may be configured in various manners including as a parallel, a series, or a series-parallel hybrid vehicle.

The electric machine 52 receives electrical power to provide torque to the wheels 55 from a traction battery 58. The electric machine 52 may also be operated as a generator to provide electrical power to charge the battery 58, for example, during a braking operation.

The engine 50 may be an internal combustion engine such as a compression ignition engine or spark ignition engine. The engine 50 has an exhaust system 60 through which exhaust gases are vented from cylinders in the engine 50 to atmosphere. The exhaust system 60 has an exhaust manifold connected to the exhaust ports of the engine cylinders. The exhaust system 60 may include one or more mufflers 61 for noise control. The exhaust system 60 may include one or more emissions control systems, such as a three way catalyst, catalytic converter, particulate filter, and the like. In some examples, the exhaust system 60 may also include an exhaust gas recirculation (EGR) system and/or a compression device such as a turbocharger.

The engine 50 also has a coolant system 62. The coolant system contains an engine coolant fluid, which may include water, glycol, and/or another fluid, to remove heat from the engine 50 during operation. The engine 50 may be provided with an internal or external cooling jacket with passages to remove heat from various regions of the engine 50 using the recirculating engine coolant fluid. The coolant system 62 may include a pump, a radiator, and a reservoir (not shown).

The vehicle has a thermodynamic cycle 70. In one example, the cycle 70 is a Rankine cycle. In another example, the cycle 70 is a modified Rankine cycle, or another thermodynamic cycle that includes a working fluid transitioning through more than one phase during cycle operation. The Rankine cycle 70 contains a working fluid. In one example, the working fluid undergoes phase change and is a mixed phase fluid within the system. The working fluid may be R-134a, R-245, or another organic or inorganic chemical refrigerant based on the desired operating parameters of the cycle. The cycle 70 is separate from the coolant system 62 for the engine.

The cycle 70 has a pump 72, compressor, or other device configured to increase the pressure of the working fluid. The pump 72 may be a centrifugal pump, a positive displacement pump, etc. The working fluid flows from the pump 72 to one or more heat exchangers. The heat exchangers may be preheaters, evaporators, superheaters, and the like configured to transfer heat to the working fluid.

The example shown has a first heat exchanger 74, which is configured as a preheater. A second heat exchanger 76 is provided, and may be configured as an evaporator. In other examples, greater or fewer heat exchangers may be provided downstream of the pump 72. For example, the cycle 70 may be provided only with heat exchanger 76, or may be provided with three or more heat exchangers to heat the working fluid. Additionally, the heat exchangers downstream of the pump 72 may be arranged or positioned in various manners relative to one another, for example, in parallel, in series as shown, or in a combination of series and parallel flows.

The heat exchangers 74, 76 are configured to transfer heat from an outside heat source to heat the working fluid within the cycle 70 and cause a phase change from liquid to vapor phase. In the example shown, the heat exchanger 74 is configured to transfer heat from the engine coolant fluid in coolant loop 62 to the working fluid in the cycle 70. The temperature of the engine coolant is therefore reduced before returning to the engine 50 to remove heat therefrom and heat exchanger 74 acts as a heat sink in the coolant system 62. The temperature of the working fluid of the cycle 70 is likewise increased within the heat exchanger 74.

In other examples, as discussed in greater detail below, the heat exchanger 74 is configured to transfer heat to the working fluid of the cycle 70 from another fluid in a vehicle system, including, but not limited to, an engine lubrication fluid, a transmission lubrication fluid, and a battery cooling fluid. In a further example, multiple preheating heat exchangers 74 are provided and are each in fluid communication with a separate vehicle system to receive heat therefrom. Valving, or another flow control mechanism may be provided to selectively direct and control flow to the multiple heat exchangers.

In another example, the heat exchanger 74 is positioned downstream of the heat exchanger 76 such that it is configured as a superheater, and transfers heat from a fluid from various vehicle systems, including, but not limited to, exhaust gas recirculation (EGR) flow. The heat exchanger 74 provides a heat sink for the EGR flow, and thereby provides waste heat to the working fluid in the cycle 70. The positioning of the heat exchanger 74 relative to heat exchanger 76 may be based on an average temperature or available heat in the waste heat fluids of the vehicle systems.

A second heat exchanger 76 is also provided in the cycle 70. The heat exchanger 76 is configured to transfer heat to the working fluid of the cycle from exhaust gases in the engine exhaust system 60 in one example. For heat exchanger 76, the engine exhaust gases in exhaust system 60 may flow through the heat exchanger 76 to directly transfer heat to the working fluid in the cycle 70. Heat exchanger 76 may be integrated with or provided as a muffler 61 in the exhaust system 60, and may replace a conventional muffler in an exhaust system 60 having one or more than one mufflers.

The engine exhaust system 60 may have a first flow path 78 through or in contact with the heat exchanger 76. The engine exhaust system 60 may also have a second, or bypass, flow path 80 to divert at least a portion of exhaust gas flow around the heat exchanger 76. The second or bypass flow path 80 may be provided by a tuning tube of the muffler, as described below. A valve 82 may be provided to control the amount of exhaust gas flowing through the heat exchanger 76, which in turn provides a control over the amount of heat transferred to the working fluid, and the temperature and state of the working fluid upstream of the expander 84. The heat exchanger 76 may be configured in various manners, for example, the heat exchanger 76 may be a single pass or multipass heat exchanger for the working fluid, and may provide for co-flow, cross-flow, or counterflow.

At least one of the heat exchangers 74, 76 is configured to transfer sufficient heat to the working fluid in the cycle 70 to evaporate the working fluid, as discussed further below. The evaporator receives the working fluid in a liquid phase or liquid-vapor mixed phase solution, and heats the working fluid to a vapor phase or superheated vapor phase. The disclosure generally describes using heat exchanger 76 as an evaporator using the engine exhaust 60; however, heat exchanger 74 in the cycle 70 may be provided as the evaporator.

The expander 84 may be a turbine, such as a centrifugal or axial flow turbine, or another similar device. The expander 84 is rotated or actuated by the working fluid to produce work as the working fluid expands. The expander 84 may be connected to a motor/generator 86 to rotate the motor/generator to generate electrical power, or to another mechanical linkage to provide additional mechanical power to the driveshaft and wheels 55. The expander 84 may be connected to the generator 86 by a shaft or another mechanical linkage. The generator 86 is connected to the battery 58 to provide electrical power to charge the battery 58. An inverter or AC-DC converter 88 may be provided between the generator 86 and the battery 58.

The working fluid leaves the expander 84 and flows to a heat exchanger 90, also referred to as a condenser 90 in the cycle 70. The condenser 90 may be positioned in a front region of the vehicle 10. The condenser 90 is configured to be in contact with an ambient air flow 92 such that heat is transferred from the working fluid to the ambient air flow 92 to remove heat from the working fluid and cool and/or condense the working fluid. The condenser 90 may be single stage or multiple stages, and the flow of the working fluid may be controllable through the various stages as required by the cycle 70 using valves or other mechanisms.

In some examples, the cycle 70 includes a fluid accumulator 94 or dryer. The accumulator 94 may be provided as a fluid or liquid reservoir for the working fluid in the cycle 70. The pump 72 draws fluid from the accumulator 94 to complete the cycle 70. As can be seen from FIG. 1, the cycle 70 is a closed loop cycle such that the working fluid does not mix with other fluids in the vehicle or with ambient air.

The cycle 70 may include a controller 96 that is configured to operate the cycle within predetermined parameters as described below. The controller 96 may be in communication with the pump 72, expander 84, and various valves and/or sensors in the cycle 70 and vehicle 10.

The controller 96 may be incorporated with or be in communication with an engine control unit (ECU), a transmission control unit (TCU), a vehicle system controller (VSC), or the like, and may also be in communication with various vehicle sensors. The control system for the vehicle 10 may include any number of controllers, and may be integrated into a single controller, or have various modules. Some or all of the controllers may be connected by a controller area network (CAN) or other system. The controller 96 and the vehicle control system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle or the cycle 70.

Figure 2:
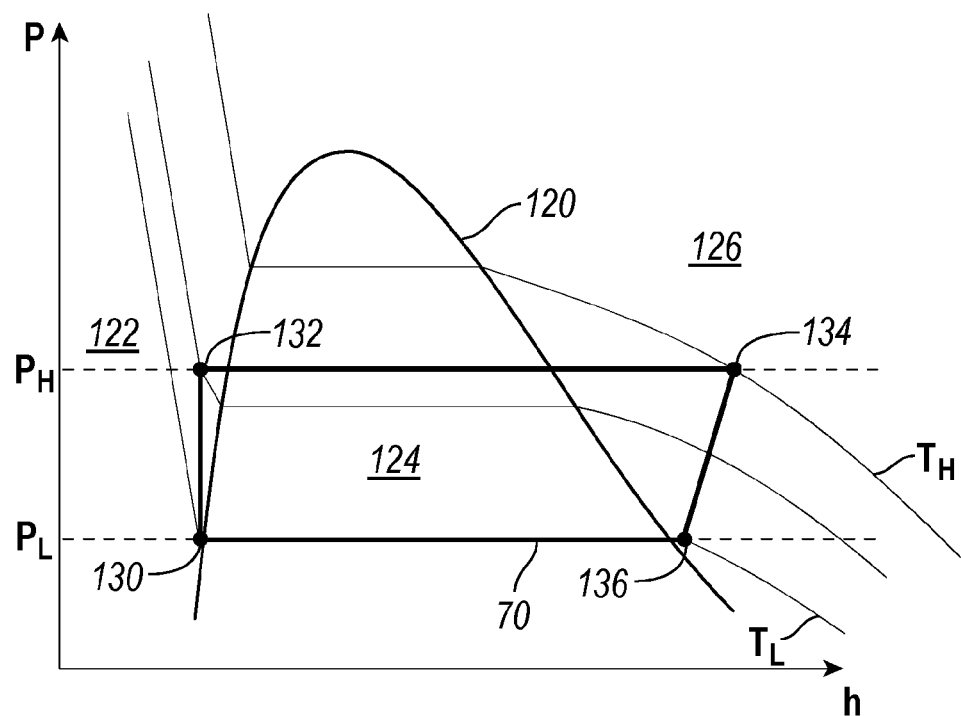
FIG. 2 illustrates a simplified pressure-enthalpy diagram for the Rankine cycle of FIG. 1.

FIG. 2 illustrates a pressure-enthalpy chart for the working fluid of the Rankine or thermodynamic cycle 70 as shown in FIG. 1. The chart has pressure (P) on the vertical axis and enthalpy (h) on the horizontal axis. Enthalpy may have units of energy per unit mass, e.g. kJ/kg.

Referring to FIGS. 1-2, in one example, a temperature sensor and a pressure sensor are provided at point 130 in the cycle to measure the temperature and the pressure of the working fluid in the cycle at the inlet to the pump 72. A temperature sensor and/or pressure sensor may also be provided at point 134 at the inlet to the expander 84 and at point 136 at the outlet of the expander 84. These temperature and pressure sensors are in communication with the controller 96 and are configured to send a signal thereto. The controller 96 may also in communication with the valve 82 to send a signal to the valve 82 or an associated control mechanism for the valve 82 to control a position of the valve 82.

The vehicle may also be provided with an air conditioning system 100 in one or more embodiments. The system 100 is separate from or independent of the cycle 70. The air conditioning system 100 may form a part of a heating, ventilation, and air conditioning (HVAC) system for the vehicle 10. The HVAC 100 system provides air at a controlled temperature to the vehicle or passenger cabin for cabin climate control by the vehicle occupants. The air conditioning system 100 has a first heat exchanger 101 or condenser in contact with the ambient air 92. The condenser 101 may be positioned in the front region of the vehicle 10. The condenser 101 is configured for heat transfer between ambient air and a refrigerant or other fluid in the system 100.

The air conditioning system 100 may also include an expansion device, valve, or throttle 102, and a compressor or pumping device 104. The system 100 has another heat exchanger 106 in contact with air flow 110 to be directed to the vehicle cabin 108, and the refrigerant in the system 100. Air flow 110, which is intended for cabin conditioning, flows over and is cooled by refrigerant in the heat exchanger 106, and then flows to the cabin 108 as required by the vehicle occupants.

The dome 120 provides a separation line between the various phases of the working fluid. The working fluid is a liquid or sub-cooled liquid in region 122 to the left of the dome 120. The working fluid is a vapor or superheated vapor in region 126 to the right of the dome 120. The working fluid is a mixed phase, e.g. a mixture of liquid and vapor phase, in region 124 underneath the dome 120. Along the left hand side of the dome 120, where region 122 and 124 meet, the working fluid is a saturated liquid. Along the right hand side of the dome 120, where region 124 and 126 meet, the working fluid is a saturated vapor.

The Rankine cycle 70 of FIG. 1 is illustrated on the chart of FIG. 2 according to an embodiment. The charted cycle 70 is simplified for the purposes of this disclosure, and any losses in the cycle 70 or system are not illustrated although they may be present in actual applications. Losses may include pumping losses, pipe losses, pressure and friction losses, heat loss through various components, and other irreversibilities in the system. The operation of the cycle 70 as shown in FIG. 2 in simplified to assume constant pressure, and adiabatic, reversible, and/or isentropic process steps as appropriate and as described below; however, one of ordinary skill in the art would recognize that the cycle 70 may vary from these assumptions in a real-world application. The cycle is charted as operating between a high pressure, $P_H$, and a low pressure, $P_L$. Constant temperature lines are shown on the chart as well, e.g. $T_H$ and $T_L$.

The cycle 70 begins at point 130 where the working fluid enters the pump 72. The working fluid is a liquid at 130, and may be sub-cooled to a temperature of 2-3 degrees Celsius or more below the saturation temperature at $P_L$. The working fluid leaves the pump 72 at point 132 at a higher pressure, $P_H$, and in a liquid phase. In the example shown, the pumping process from 130 to 132 is modeled as being isentropic, or adiabatic and reversible.

The working fluid enters one or more heat exchangers at 132, for example, heat exchangers 74, 76. The working fluid is heated within the heat exchangers 74, 76 using waste heat from the engine exhaust and other vehicle waste heat sources. The working fluid leaves the heat exchangers as a vapor or superheated vapor at point 134. The heating process from 132 to 134 is modeled as a constant pressure process. As can be seen from the Figure, the process from 132 to 134 occurs at $P_H$, and the temperature increases to $T_H$ at 134. The working fluid begins in a liquid phase at 132 and leaves the heat exchangers 74, 76 in a superheated vapor phase at 134.

The working fluid enters an expander 84, such as a turbine, at point 134 as a superheated vapor. The working fluid drives or rotates the expander as it expands to produce work. The working fluid exits the expander 84 at point 136 at a pressure, $P_L$. The working fluid may be a superheated vapor at 136, as shown. In other examples, the working fluid may be a saturated vapor or may be mixed phase and in region 124 after exiting the expander 84. In a further example, the working fluid is within a few degrees Celsius of the saturated vapor line on the right hand side of dome 120. In the example shown, the expansion process from 134 to 136 is modeled as isentropic, or adiabatic and reversible. The expander 84 causes a pressure drop and a corresponding temperature drop across the device as the working fluid expands.

The working fluid enters one or more heat exchangers at 136, for example, heat exchanger 90. The working fluid is cooled within the heat exchanger 90 using ambient air received through the frontal region of the vehicle. The working fluid leaves the heat exchanger 90 at point 130, and then flows to the pump 72. An accumulator may also be included in the cycle 70. The cooling process from 136 to 130 is modeled as a constant pressure process. As can be seen from the Figure, the process from 136 to 130 occurs at $P_L$. The temperature of the working fluid is decreased within the heat exchanger 90. The working fluid begins as a superheated vapor or vapor-liquid mixed phase at 136 and leaves the heat exchanger 90 as a liquid at 130.

In one example, the cycle 70 is configured to operate with a pressure ratio of $P_H$ to $P_L$ of approximately 3, or in a further example, with a pressure ratio of approximately 2.7. In other examples, the pressure ratio may be higher or lower. The cycle 70 may be adapted to operate in various ambient environments as required by the vehicle 10 and its surrounding environment. In one example, the cycle 70 is configured to operate across a range of possible ambient temperatures. The ambient temperature may provide a limit to the amount of cooling available for the working fluid in the heat exchanger 90. In one example, the cycle 70 may be operated between an ambient or environmental temperature of −25 degrees Celsius and 40 degrees Celsius. In other examples, the cycle 70 may operate at higher and/or lower ambient temperatures.

The power provided by the cycle 70 may be a function of the mass flow rate of the waste heat fluid, the temperature of the waste heat fluid, the temperature of the working fluid at point 134, and the mass flow rate of ambient air. For example, with exhaust gas providing the sole source of waste heat, the power provided by the cycle 70 is a function of the mass flow rate of exhaust gas through the heat exchanger 76, the temperature of the exhaust gas entering heat exchanger 76, the temperature of the working fluid at point 134, and the mass flow rate of ambient air. For systems with more than one waste heat source, the mass flow rates and temperatures of each source would also be included for the power provided by the cycle 70. In one example, the power out of the cycle 70 is on the order of 1.0-2.0 kW, and in a further example, is approximately 1.5 kW for a cycle with exhaust temperatures ranging from 600-800 degrees Celsius, and an exhaust gas mass flow rate ranging from 50-125 kg/hr.

The efficiency of the cycle 70 with respect to the vehicle 10 may be determined based on the electric power produced by the generator 86, and a rate of heat transfer available from the waste heat sources, e.g. engine exhaust, engine coolant, etc. The rate of heat available is a function of the mass flow rate of the waste heat fluid through the associated cycle heat exchanger and the temperature difference of the waste heat fluid across the heat exchangers. In one example, the cycle efficiency was measured to be above 8% on average using exhaust gas heat only, and in a further example, the cycle efficiency was measured to be above 10% on average for a cycle using exhaust gas waste heat only.

Maintaining the state or phase of the working fluid at specific operation points within the cycle 70 may be critical for system operation and maintaining system efficiency. For example, one or both of the heat exchangers 74, 76 may need to be designed for use with a liquid phase, a mixed phase fluid, and a vapor phase fluid. The working fluid may need to be a liquid phase at point 130 in the cycle to prevent air lock within the pump 72. Additionally, it may be desirable to maintain the working fluid as a vapor between points 134 and 136 based on the expander 84 construction, as a mixed phase may reduce system 70 efficiencies or cause wear on the device 84. Based on the ambient air temperature, and the speed of the vehicle, which controls the ambient air flow rate, the amount and/or rate of cooling that is available to the working fluid within the heat exchanger 90 may also be limited. Furthermore, the amount and/or rate of heat available to heat the working fluid may be limited at vehicle start up when the engine exhaust and/or engine coolant has not reached their operating temperatures.

The cycle 70 may be operated at various operating conditions, for example, based on a minimum ambient air operating temperature, $T_{L,min}$ and a maximum ambient air operating temperature, $T_{H,max}$. The working fluid is selected based the cycles and operating states of the various points in the cycle, and the constraints imposed by these operating states. Additionally, the cycle 70 may be controlled to operate within a desired temperature and pressure range by modifying the flow rate of exhaust gas or other waste heat source through the heat exchangers 74, 76, thereby controlling the amount of heat transferred to the working fluid and its temperature at point 134. The heat exchanger 90 may also be controlled by providing additional stages, or limiting stages for working fluid to flow through based on the ambient air temperature, flow rate, and humidity, thereby controlling the amount of cooling and the working fluid temperature at point 130. Additionally, the flow rate of the working fluid may be controlled by the pump 72, such that the working fluid has a longer or shorter residence time in each heat exchanger 74, 76, 90, thereby controlling the amount of heat transferred to or from the working fluid.

Figure 3:
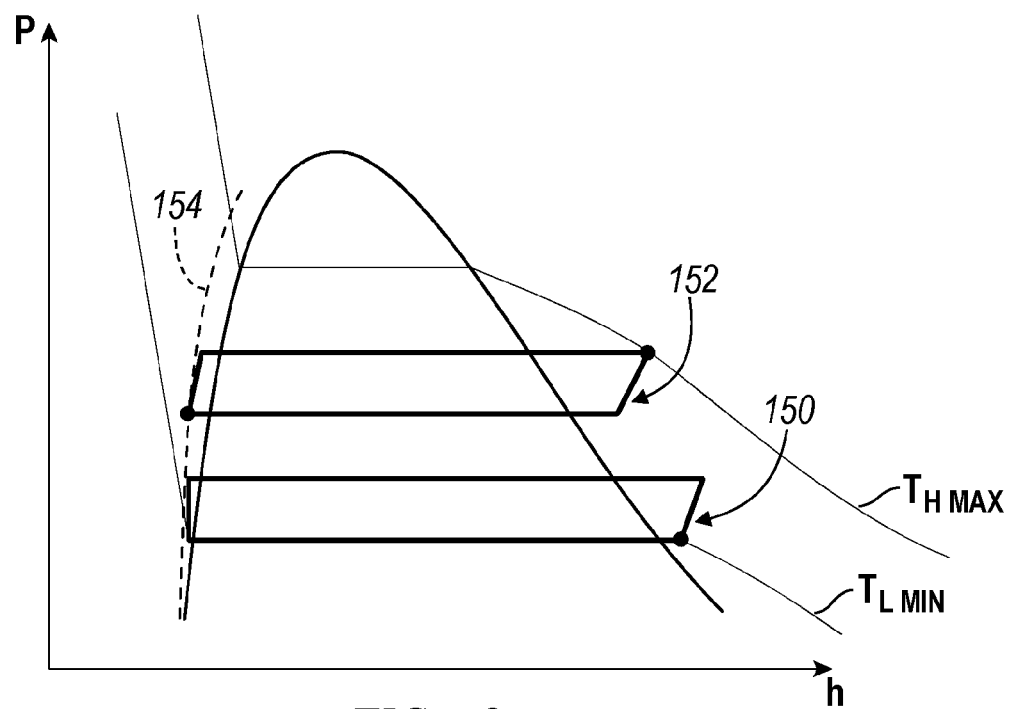
FIG. 3 illustrates a simplified pressure-enthalpy diagram for the Rankine cycle of FIG. 1 at various operating conditions.

The cycle 70 may be operated at various operating conditions, as shown in FIG. 3. FIG. 3 illustrates two operating conditions for the cycle 70. Cycle 150 is shown operating at or near a minimum ambient air operating temperature, $T_{L,min}$. Cycle 152 is shown operating at or near a maximum ambient air operating temperature, $T_{H,max}$. The working fluid is selected based the cycles and operating states of the various points in the cycle, and the constraints imposed by these operating states, for example, maintaining point 130 of each cycle 150, 152 as a compressed liquid as shown by broken line 154. Line 154 represents a target state for the pump inlet at point 130, and in one example, is two to four degrees Celsius cooler than the saturated liquid line or the left hand side of the dome 120. Additionally, the cycle 70 may be controlled to operate within a desired temperature and pressure range by modifying the flow rate of exhaust gas through the heat exchanger 76 using valve 82, thereby controlling the amount of heat transferred to the working fluid and its temperature at point 134. Valve 82 may be a two position valve, or may be controllable to provide variable flow. The heat exchanger 90 may also be controlled by providing additional stages, or limiting stages for working fluid to flow through based on the ambient air temperature, flow rate, and humidity, thereby controlling the amount of cooling and the working fluid temperature at point 130. Additionally, the flow rate of the working fluid may be controlled by the pump 72, such that the working fluid has a longer or shorter residence time in each heat exchanger 90, 74, 76, thereby controlling the amount of heat transferred to or from the working fluid.

Figure 4:
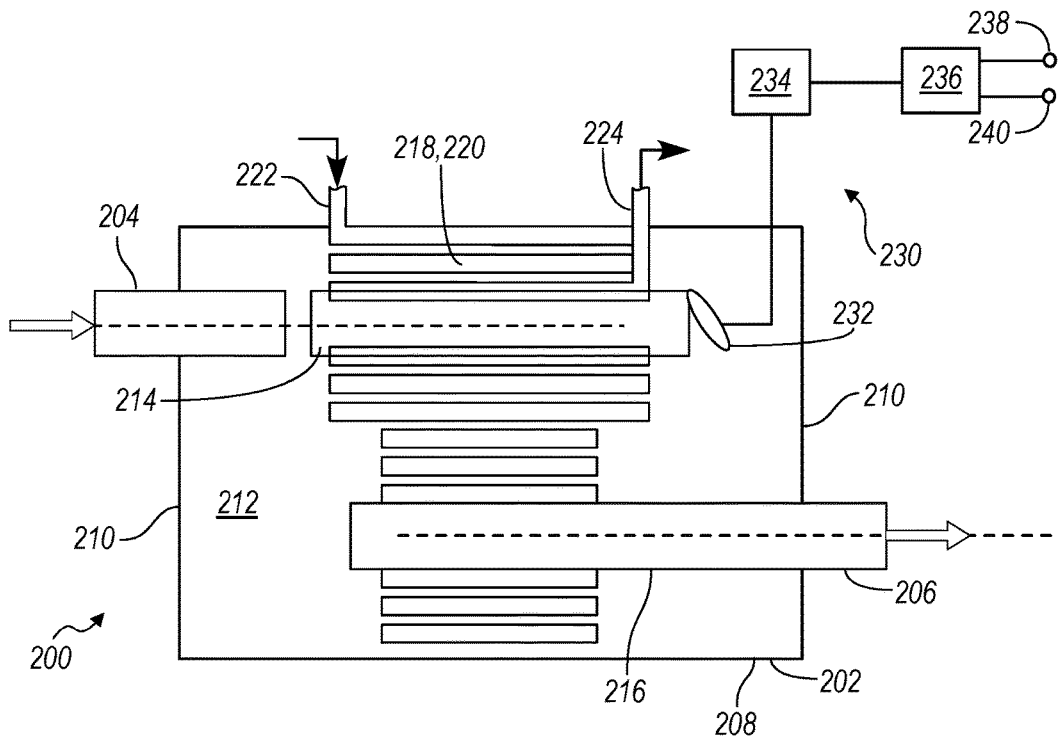
FIG. 4 illustrates a schematic of a muffler with a heat exchanger according to an embodiment.

FIG. 4 illustrates a schematic of an apparatus or device 200 for use as a muffler 61 that integrates a heat exchanger 76 and bypass valve 82 for use with the cycle 70.

The device 200 has a muffler body 202 or housing 202 that defines an interior region 212 or space. The body defines an exhaust gas inlet 204 to receive exhaust gases from the engine. The body also has an exhaust gas outlet 206 downstream of the inlet 204. In one example, the body 202 is defines by a continuous side wall 208, and a pair of opposed end walls 210. The inlet 204 and the outlet 206 may be on opposed walls 210 as shown, or may be positioned on the same wall 210 in another embodiment. The inlet 204 and the outlet 206 are illustrated as being offset from one another, such that the inlet 204 and the outlet 206 extend along axes that are parallel to one another. In other examples, the inlet and outlet 204, 206 may be coaxial with one another.

The interior region 212 of the body 202 provides a location or space for the various heat exchanger and muffler noise reduction components. One or more tuning tubes 214, 216 are supported within the interior region 212. In the example shown, the muffler 200 has two tuning tubes 214, 216. In other examples, the muffler 200 may have only one tuning tube, or more than two tuning tubes. Each tube 214, 216 is hollow and has open ends, and may be provided as a cylindrical tube or pipe. The tuning tubes 214, 216 may provide control over the sound of the exhaust, as well as impact the overall noise produced by the vehicle. One or both of the tuning tubes 214, 216 may have perforations spaced along the length of the tube, or at various locations along the tube.

In other examples, one or both of the tuning tubes 214, 216 has a solid wall such that it is without perforations.

The first tuning tube 214 is illustrated as being a freestanding tube, e.g. both ends of the tube are spaced away from the housing 202 or are inset from the end walls 210. Tuning tube 214 may be provided as bypass 80 in FIG. 1. The second tuning tube 216 is illustrated as being connected to the outlet 206 and is connected to and at least partially supported by one of the end walls 210.

A heat exchanger 220 is also positioned within the interior region 212 of the muffler 200. A conduit 218 is shaped to provide the heat exchanger 220 such as an evaporator 76 to transfer heat from the exhaust gases in the muffler body 202 and the working fluid passing through the conduit 218.

The conduit 218 and heat exchanger 220 act to support the tuning tube 214 and a valve within the muffler body 202. In one example, the conduit 218 supports only the tuning tube 214, and in other examples, supports both tuning tubes 214, 216 as shown. In a conventional muffler, partitions or baffles may be provided within the interior region 212 to act as bridges and support the tuning tubes 214, 216 in the desired locations, and to also support any sound reduction materials within the muffler 200. In the present example, the structure of the heat exchanger 220 itself provides the necessary support and locating functions for one or more of the tuning tubes 214, 216 within the heat exchanger. The conduit 218 and heat exchanger 220 are in thermal contact with exhaust gas and the working fluid.

The heat exchanger 220 or evaporator has a body that defines a first passage therethrough for flow of the working fluid and a second passage for flow of the exhaust gas therethrough. In one example, the heat exchanger 220 may be formed from a continuous conduit 218 or tube, which is curved, bent, or otherwise shaped to provide a continuous path therethrough for the working fluid in the muffler 200. The conduit 218 may be shaped for example, as a coil, helix, or other intricately folded, twisted, or coiled shape to provide curved or tortuous flow path(s) for the working fluid. The conduit 218 may be shaped to fill a volume within the interior region 212 of the muffler and support the tuning tube 214, 216. The hollow interior of the conduit 218 provides the first passage, and the outer surface of the conduit 218 forms the second passage.

In other examples, the heat exchanger 220 may be provided by one or more sheets that are stamped or otherwise formed and connected to form passages for the working fluid therein. These sheets may then be coiled or otherwise shaped or formed to fill a volume within the interior region 212 of the muffler and support the tuning tube 214, 216.

Generally, the outer surface of the heat exchanger 220 forms the second passage and is in contact with the exhaust gases. The heat exchanger 220 has an inlet 222 and an outlet 224 for the working fluid, and the inlet 222 and outlet 224 may be provided as ports on the housing 202 of the muffler. In other examples, the heat exchanger 220 may have multiple inlets 222 and outlets 224. The outer surfaces of the heat exchanger 220 may also act as a baffle or other flow director or diverter within the muffler to control or direct flow of the exhaust gases.

The heat exchanger 220 is shaped such that it encircles or surrounds the tuning tube 214 in the muffler. The heat exchanger 220 extends outwardly from the tuning tube 214 to an inner wall of the housing 202 to prevent movement of the tuning tube within the housing. The heat exchanger 220 encircles the tuning tube 214 such that tuning tube is positioned within a central region of the housing.

The heat exchanger 220 may also encircle other tuning tubes, such as tube 216, within the housing 202 to at least partially support and locate the tuning tube 216. The heat exchanger 220 extends outwardly from the tuning tube 216 to an inner wall of the housing to prevent movement of the tuning tube within the housing, and to position the tuning tube within a central region of the housing.

The heat exchanger 220 may be a single stage heat exchanger, or may have multiple stages that are arranged in parallel or in series with one another. The working fluid may be one of a liquid phase, a vapor phase, or a mixed liquid vapor phase as it enters the heat exchanger 220, and the working fluid may exit the heat exchanger as a vapor phase.

The heat exchanger 220 is designed to reduce the temperature of the exhaust gases via heat transfer to the working fluid. The heat exchanger 220 may reduce the temperature of the exhaust gases by approximately 400 degrees Celsius in one example. In some examples, the heat exchanger reduces the temperature of the exhaust gases from 700 degrees Celsius to as low as 100 degrees Celsius. This active reduction in exhaust gas temperature provides for an associated reduction in noise, which allows for the overall exhaust gas system to have fewer mufflers and/or reduced total muffler volume. Additionally, the structure of the heat exchanger 220 in the muffler causes an associated reduction in noise, as the heat exchanger acts as baffles and other noise reducing features to counteract pressure waves of the exhaust gases.

The heat exchanger 220 may be made from various materials and manufactured accordingly. In the example shown, the heat exchanger 220 is made from a metal, such as steel, and is welded or otherwise connected together. In other examples, the heat exchanger may be made from other materials based on their thermal conductivities, melting temperatures, and other material properties such as corrosion or chemical resistance, etc. The heat exchanger 220 may also need to be designed with pressure drops as a consideration, both for the working fluid and for the exhaust gases, e.g. to provide a low or controlled pressure drop for the exhaust gas across the heat exchanger 220 to limit a back pressure on the engine.

The heat exchanger 220 provides for heating of the working fluid such that the energy or enthalpy of the working fluid increases. As this is a generally constant pressure process, the heat transferred to the working fluid causes a phase change in the working fluid as the latent heat of vaporization for the working fluid is reached. The working fluid transitions from a liquid, to a liquid-vapor saturated mixture, and to a vapor phase. The heat exchanger may be provided with periodic vapor outlets or vents that connect to the working fluid outlet, or be otherwise shaped or formed to prevent or reduce vapor pockets or "hot spots" in the passages for the working fluid n the heat exchanger, which may lead to thermal fatigue of the evaporator and potential for leak issues.

A valve 230 is connected to or supported by the tuning tube 214. The valve 230 controls the flow of exhaust gas through the tuning tube 214. Valve 230 may be provided as valve 82 in FIG. 1.

The valve 230 has a moving element 232. The moving element may be a flap, disc, or other shaped element that moves relative to the tuning tube 214. A hinge, stem, or the like connects the moving element 232 to the tuning tube 214. The moving element 232 may be positioned at an end of the tuning tube 214. In the present example, the moving element 232 of the valve is positioned at the downstream end of the tuning tube 214, which allows for exhaust gases to flow through any perforations provided in the tube 214. In other examples, the valve element 232 may be positioned at the upstream end of the tube 214, or in a central or intermediate region of the tube. The valve element 232 is sized to cooperate with the tuning tube 214 to control the flow of exhaust gases through the tube.

The moving element 232 of the valve 230 moves between a first, closed position, and a second, open position. When the valve 230 and moving element 232 are in the first position, the element 232 seals against or mates with the tuning tube 214 to prevent the flow of exhaust gases across the valve 230 and through the tuning tube 214. When the valve and moving element 232 are in the second position, the moving element 232 moves such that a space is created between the tuning tube 214 and the valve element 232 for exhaust gases to flow through. In one example, the valve 230 is a two position valve, such that the moving element has only the first and second positions. In other examples, the valve 230 may be controlled as a variable position and variable flow valve, such that the moving element 232 may be in the first position, the second position, or in any number of partially open positions between the first and second position.

The valve 230 has a valve mechanism 234 to control the position of the moving element 232 with respect to the tuning tube 214. In one example, the mechanism 234 is a spring such that the valve element 232 moves in response to a force on the spring, which may be an exhaust gas pressure or a pressure of the working fluid in the cycle. The spring may act to bias the valve element 232 in the first position, such that the valve 230 opens in response to a force such as a high exhaust pressure or a high working fluid pressure. In another example, the mechanism 234 is provided by a thermostatic element such that the valve 230 opens in response to a temperature, e.g. a temperature of the working fluid. In yet another example, the mechanism 234 is provided by an electromechanical mechanism, such as a solenoid, an electric motor, or other actuators, or may be pneumatically or hydraulically controlled, for example, by using a pilot line fluidly coupled to the working fluid in the cycle 70.

A controller 236 is connected to the mechanism 234 for a controllable mechanism such as an electromechanical actuator. The controller 236 may be the controller 96 as shown in FIG. 1, or may be a separate controller in communication with the controller 96. The controller 236 is in communication with the valve mechanism 234, and is also in communication with a temperature sensor 238 for sensing a temperature of the working fluid in the cycle and/or a pressure sensor 240 for sensing the pressure of the working fluid in the cycle 70. The controller 236 controls a position of the valve 230 to control exhaust gas flow through tuning tube 214 in response to receiving a signal indicative the temperature and/or the pressure of the working fluid. In one example, the sensors 238, 240 are positioned at the inlet to the pump 72, for example, at point 130 in the cycle 70. By providing the temperature and the pressure of the working fluid at point 130 to the controller 236, the state of the working fluid at point 130 is known, and the controller 236 may control the valve 230 position to maintain the state of the working fluid at point 130, to provide more or less exhaust gas flow through the heat exchanger to modify the state of the working fluid at point 130. The controller 236 controls the valve 230 position to generally maintain point 130 in the cycle 70 along the line 154 as shown in FIG. 3.

The valve 230 position may also be controlled or modified based on the temperature of the exhaust gases at the inlet to the muffler 220, an ambient or environmental temperature, vehicle speed, engine load, the flow rate of the exhaust gases, the flow rate of the working fluid, and other factors. These additional inputs to the controller 236 allow for greater control over the state of the working fluid in the cycle and may be used to reduce hysteresis or valve cycling.

By controlling the flow of exhaust gas through the tuning tube 214, the flow of exhaust gas over and through the heat exchanger 220 is also controlled. When the valve 230 is closed, flow of the exhaust gases through the tuning tube 214 is blocked, such that the exhaust gases are forced to flow through the heat exchanger 220 to heat the working fluid. When the valve 230 is opened, at least a portion of the exhaust gases flow through the tuning tube 214, which reduces the portion of exhaust gases flowing over and through the conduits 218 of the heat exchanger 220, and provides a bypass function for the heat exchanger 220 to prevent overheating of the working fluid.

As the thermal capacities of the condenser, evaporator and expander in the cycle 70 vary based on the operating condition, e.g. ambient temperature, vehicle speed, engine load, the bypass valve 230 of the evaporator 220 is used to adjust the energy transferred into the working fluid from the exhaust gases through the evaporator. Generally, the valve 230 is controlled by the working fluid state at the pump inlet, or point 130 which corresponds to a point on the line 154. When the working fluid temperature is too high at point 130, the bypass valve 230 is opened further to reduce the energy transferred into the working fluid and lower its temperature. When the working fluid temperature is too low at point 130, the cycle 70 is operating over-sub-cooled, and the bypass valve 230 is closed further to increase the energy transferred into the working fluid and increase its temperature.

Figure 5:
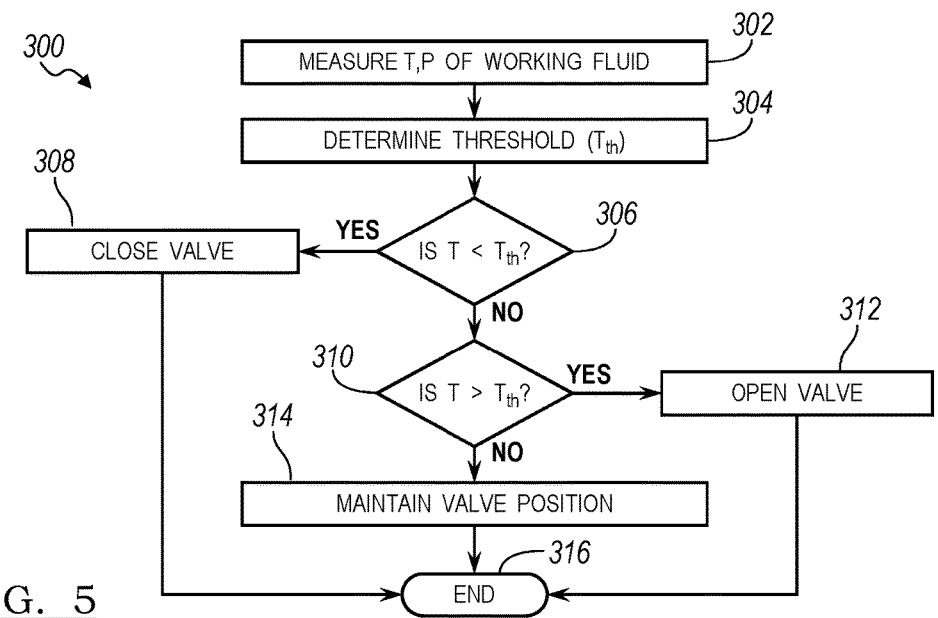
FIG. 5 illustrates a method of controlling the heat exchanger and muffler of the vehicle according to an embodiment.

FIG. 5 illustrates an example of a method 300 for controlling the muffler 200 in the vehicle. Various embodiments of the method 300 may include greater or fewer steps, and the steps may be performed in another order than illustrated.

At 302, the temperature of the working fluid is measured and a signal indicative of the temperature is sent to the controller 236. The pressure of the working fluid may also be measured and a signal indicative of the pressure is sent to the controller 236. In one example, the temperature and pressure are measured at point 130 in the cycle. In other examples, the temperature and pressure are measured at other locations, and the temperature and pressure at point 130 are inferred from the measured values and other cycle operating parameters.

At step 304, a temperature threshold or threshold value is determined. The temperature threshold (Tth) may be determined by the controller 236 via a function or lookup table as defined by line 154 in FIG. 3.

At steps 306 and 310, the temperature of the working fluid at point 130 is compared to the temperature threshold. If the temperature is less than the threshold, the method proceeds to step 308, and controls the valve 230 position such that the valve closes or at least partially closes from its present state. If the temperature is greater than the threshold, the method proceeds to step 312, and controls the valve 230 position such that the valve opens or at least partially opens from its present state. If the temperature is equal to the temperature threshold, the method 300 proceeds to step 314 and maintains the valve 230 position in its present state.

If the valve 230 is a variable position valve the controller 236 may additionally determine how far to open or close the valve, or change the valve position from its present state, based on a temperature difference between the measured temperature and the threshold.

The method ends at step 316. The method 300 may be run by the controller 236 at specified time intervals, or may be continuously run in a looped control strategy.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an engine having an exhaust gas system comprising a muffler body containing a valve controlling exhaust gas flow through a tuning tube;
   an expander, a condenser, a pump, and an evaporator in sequential fluid communication in a closed loop containing a working fluid; and
   a controller in communication with the valve, a temperature sensor for sensing a temperature of the working fluid, and a pressure sensor for sensing a pressure of the working fluid, the controller controlling a position of the valve to control exhaust gas flow through the evaporator in response to receiving a first signal indicative of the temperature of the working fluid and a second signal indicative of the pressure of the working fluid;
   wherein the evaporator is positioned within the body and supports the valve and tuning tube therein, the evaporator in thermal contact with exhaust gas and the working fluid.

2. The vehicle of claim 1 wherein the temperature sensor is positioned between the condenser and the pump in the closed loop.

3. The vehicle of claim 1 wherein the valve is positioned at a downstream end of the tuning tube; and
   wherein the controller controls the position of the valve such that the working fluid comprises a liquid phase at an inlet to the pump.

4. The vehicle of claim 1 wherein the evaporator comprises a body defining a first passage therethrough for flow of the working fluid and a second passage for flow of the exhaust gas therethrough; and
   wherein the second passage fluidly couples an exhaust gas inlet of the muffler body with an exhaust gas outlet of the muffler body such that exhaust gases flow through the muffler body regardless of a position of the valve.

5. The vehicle of claim 4 wherein the body of the evaporator provides at least one baffle within the muffler body.

6. The vehicle of claim 1 wherein the working fluid is a mixed phase working fluid.

7. A vehicle muffler comprising:
 a housing having an exhaust gas inlet and an exhaust gas outlet;
 a tuning tube positioned within the housing and having an upstream end and a downstream end supporting a valve thereacross to control exhaust gas flow through the tuning tube, the upstream and downstream ends spaced apart and inset from the exhaust gas inlet and the exhaust gas outlet of the housing; and
 a Rankine cycle conduit having a working fluid flowing therethrough, the conduit positioned within the housing, supporting the tuning tube, and in thermal contact with exhaust gases and the working fluid thereby providing an evaporator for the Rankine cycle.

8. The muffler of claim 7 wherein the valve has a first position to prevent exhaust gas flow through the tuning tube and a second position to provide for exhaust gas flow through the tuning tube.

9. The muffler of claim 7 wherein the conduit encircles the tuning tube such that the tuning tube is positioned within a central region of the housing.

10. The muffler of claim 9 wherein the conduit is formed in a convoluted shape such that the conduit extends between an outer wall of the tuning tube and an inner wall of the housing.

11. The muffler of claim 7 wherein the tuning tube is a first tuning tube; the muffler further comprising:
 a second tuning tube positioned within the housing.

12. The muffler of claim 11 wherein the first and second tuning tubes extend along first and second longitudinal axes, respectively, the first and second longitudinal axes offset and parallel to one another.

13. The muffler of claim 11 wherein the second tuning tube is supported by the conduit within the housing.

14. The muffler of claim 7 further comprising a controller in communication with the valve, a temperature sensor for sensing a temperature of the working fluid, and a pressure sensor for sensing a pressure of the working fluid, the controller controlling a position of the valve to control exhaust gas flow through the evaporator in response to receiving a first signal indicative of the temperature of the working fluid and a second signal indicative of the pressure of the working fluid.

15. A method of controlling a vehicle comprising:
 heating a working fluid in a heat exchanger in a thermodynamic cycle, the heat exchanger positioned within a muffler to support a tuning tube therein and in thermal contact with engine exhaust gases; and
 in response to receiving signals indicative of a temperature and a pressure of the working fluid, controlling a position of a valve associated with the tuning tube to control exhaust gas flow therethrough.

16. The method of claim 15 further comprising opening the valve in response to the temperature of the working fluid being above a threshold value such that at least a portion of the exhaust gases in the muffler flow through the tuning tube.

17. The method of claim 15 further comprising closing the valve in response to the temperature of the working fluid being below a temperature threshold to increase the flow of exhaust gases through the heat exchanger.

18. The method of claim 15 wherein the thermodynamic cycle is a Rankine cycle, the method further comprising:
 measuring the temperature of the working fluid in the thermodynamic cycle at an inlet to a pump in the Rankine cycle;
 wherein the valve is controlled such that the working fluid is a liquid phase at the inlet to the pump.

* * * * *